Patented Apr. 10, 1945

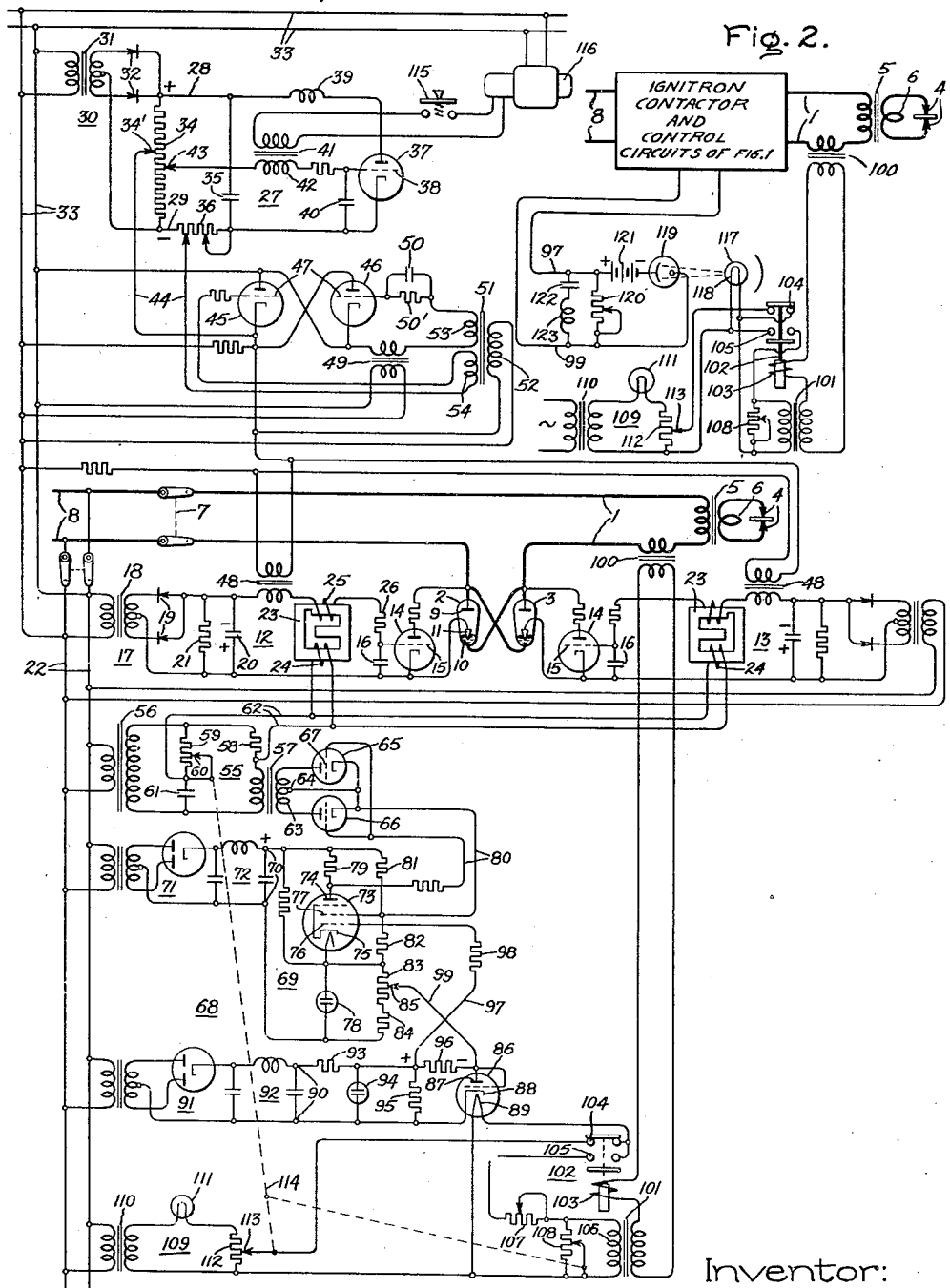

2,373,543

UNITED STATES PATENT OFFICE 2,373,543

LIGHT SENSITIVE ELECTRIC VALVE SYSTEM

Benjamin Cooper, Scotia, N. Y., assignor to General Electric Company, a corporation of New York Application December 18, 1941, Serial No. 423,526

4 Claims. (Cl. 250—41.5)

My invention relates to electric valve translating systems and more particularly to control or regulating circuits for electric valve apparatus.

Due to the precision of operation afforded by electric valve apparatus, such as electric valve means which employ ionizable mediums and which include control members for initiating conduction thereby, apparatus of this type has been applied rather generally to those systems where it is important to obtain precise and accurate control of an electrical condition of a load circuit. Furthermore, due to the facility of control provided by apparatus of this nature, electric valve means have been applied to those arrangements where it is important to effect periodic or intermittent energization of the associated load circuit. In accordance with the teachings of my invention described hereinafter, I provide new and improved control or regulating circuits for electric valve translating apparatus whereby the electric valve means is controlled more accurately than that obtainable by the prior art arrangements, and wherein the characteristics of the electric valve apparatus may be employed to greater advantage.

It is an object of my invention to provide new and improved electric valve translating apparatus.

It is another object of my invention to provide new and improved control circuits for electric valve translating apparatus.

It is a further object of my invention to provide new and improved control or regulating circuits.

It is a still further object of my invention to provide new and improved control or regulating circuits for electric valve translating apparatus which effect energization of a load circuit periodically or intermittently.

Briefly stated, in the illustrated embodiments my invention is shown as applied to electric valve translating systems, such as welding systems, where the welding circuit or the load circuit is periodically or intermittently energized, and wherein the regulating or control circuits respond substantially instantaneously to maintain the desired electrical condition of the load circuit at a precise value by pre-setting or pre-conditioning the system.

For a better understanding of my invention, reference may be had to the following description taken in connection with the accompanying drawing, and its scope will be pointed out in the appended claims. Fig. 1 of the drawing diagrammatically illustrates an embodiment of my invention as applied to a translating system for energizing a load circuit, such as a welding circuit, and Fig. 2 is a modification of the arrangement shown in Fig. 1.

Referring now to Fig. 1 of the drawing, my invention is illustrated there as applied to an electric translating system, such as an electric valve translating system, wherein a load circuit 1 is energized by means of electric translating apparatus which may comprise a pair of reversely connected electric valve means 2 and 3. The load circuit 1 may be a welding circuit which is connected to the welding electrodes 4 through a transformer 5 having a secondary winding 6 connected to the welding electrodes. A suitable circuit controlling means, such as a switch 7, may be interposed between the load circuit 1 and a suitable source of current, such as an alternating current supply circuit 8.

Electric valve means 2 and 3 may be of the type comprising an ionizable medium, such as a gas or a vapor, and each may include an anode 9, a cathode such as a mercury pool cathode 10, and a control member such as an immersion-ignitor type control member 11 having an extremity thereof extending into the pool of the associated cathode.

I employ excitation circuits 12 and 13 which control the conductivities of the electric valve means 2 and 3, that is control the time during the respective positive half cycles of anode-cathode voltage at which the electric valve means conduct current. The excitation circuits 12 and 13 are of similar construction and arrangement, and each comprises a control electric valve 14 which transmits energizing impulses of current to the control member 11 of the associated main or power electric valve means 2 or 3. If desired, the control electric valves 14 may be connected between the anodes and the control members 11 of the associated main electric valves. Control electric valves 14 comprise control members or grids 15, the potentials of which control the conductivities thereof and, hence, control the time of energization of the control members 11. Transient absorbing means, such as capacitances 16, may be connected between the grids 15 and the cathodes of the control electric valves 14.

Each of the excitation circuits 12 and 13 also comprises means for impressing on the grids 15 of the electric valves 14 biasing potentials, such as negative unidirectional biasing potentials, tending to maintain the electric valves nonconducting. The biasing potential in each excitation circuit may be provided by means of a rectifier 17 which may be of the bi-phase type comprising a transformer 18 and a pair of unidirectional conducting paths or rectifiers 19 which establish across capacitance 20 and resistance 21 a negative unidirectional potential of the polarity indicated. Transformer 18 may be energized from alternating current supply circuit 8 through circuit 22 which, in turn, is connected to circuit 8 through a switch.

As a means for rendering the electric valves 14 conducting in cooperation with alterating voltages which are described hereinafter, I provide in each of the excitation circuits 12 and 13 means for producing a control voltage, such as a periodic control voltage of peaked wave form. This means may comprise a saturable inductive device, such as a peaking transformer 23 provided with a primary winding 24 and a secondary winding 25 which is connected to grid 15 through a current limiting resistance 26. The magnitude of the voltage of peaked wave form is such that the peaked wave form is insufficient in itself to overcome the effect of the negative unidirectional biasing potential produced by capacitance 20.

Where it is desired to effect energization of the load circuit 1 for a predetermined time, I may employ timing means 27. The timing means 27 produces a timing voltage which determines the period of conduction of electric valve means 2 and 3, and hence determines the energization of load circuit 1. In some applications it is also desirable not only to effect energization of the load circuit for a predetermined interval of time, but it is also desirable to effect periodic or intermittent energization of the load circuit during recurring intervals of time. In order to meet these requirements, I provide in the timing means 27 a circuit which generates a periodic timing voltage. Timing means 27 may comprise a source of direct current comprising a positive conductor 28 and a negative conductor 29. The source of direct current may be provided by means of a rectifier 30 comprising a transformer 31 and a pair of unidirectional conducting paths such as rectifiers 32 which are energized from the supply circuit 8 through circuit 33. A suitable voltage divider comprising a resistance 34 is connected across a source of direct current, and a capacitance 35 is connected to be charged from the source through an adjustable resistance 36. Periodic discharge of capacitance 35 is obtained by means of an electric valve 37 which is of the controlled type having a grid 38. If desired, the electric valve 37 may be of the type employing an ionizable medium such as a gas or a vapor, in which case I may employ in the anode-cathode circuit of the electric valve 37 an inductance 39 which serves to render the electric valve 37 non-conducting near the end of the discharge period of capacitance 35. A transient-absorbing capacitance 40 is connected between the grid 38 and the cathode of the electric valve 37. Synchronization of the generation of each impulse of periodic voltage produced by circuit 37 with respect to the voltage of supply circuit 8 is obtained by means of a transformer 41 which produces a periodic voltage of peaked wave form. Secondary winding 42 of transformer 41 is connected between grid 38 of electric valve 37 and an adjustable contact 43 of the voltage divider comprising resistance 34. The periodic voltage produced by the timing means 27 appears across circuit 44.

I may employ a pair of reversely connected coupling electric valves 45 and 46, each including a control grid 47, and which are controlled by the timing circuit 27 and which serve to introduce into excitation circuits 12 and 13 a predetermined number or trains of half cycles of alternating voltage through transformers 48. The anode-cathode circuits of thee lectric valves 45 and 46 are energized from circuit 33, and when in a conducting condition supply alternating current to transformers 48. These electric valves may be arranged in a leading and trailing relationship; that is, the electric valve 46 is arranged to conduct current during each half cycle of the voltage of circuit 33 following each half cycle of conduction of electric valve 45. That is, the electric valve 45 is the leading electric valve and electric valve 46 is the trailing valve.

Electric valve 46 is normally maintained non-conducting by means of a biasing potential impressed on its grid 47 by means of the transformer 49 which is energized from circuit 33. Transformer 49 is poled so that the alternating component of grid excitation furnished by this transformer is 180 electrical degrees out of phase with respect to the voltage impressed on the anode and cathode of this electric valve. If desired, a further biasing means, such as a self-biasing circuit comprising a parallel connected capacitance 50 and a resistance 50', may also be connected to grid 47 of electric valve 46. In order to overcome the effect of the biasing potentials in response to the conductivity or current conducted by electric valve 45, I employ a transformer 51 having a primary winding 52 connected to be energized in response to the current conducted by electric valve 45. Secondary winding 53 of this transformer is connected in circuit with the means which provides the two above-mentioned biasing potentials. Transformer 51 may also be provided with another winding 54 which is energized in series relation with circuit 44 and grid 47 of electric valve 45 in order to prevent shift in phase of the voltage impressed on grid 47 of electric valve 46.

The control electric valves 14 in excitation circuits 12 and 13, and hence the main electric valves 2 and 3, are rendered conducting alternately by the conjoint action of the alternating voltages introduced into the transformers 48 and the peaked voltages produced by peaking transformers 23. As a means for controlling the time during the half cycles of voltage of circuit 8 at which the electric valves 2 and 3 begin to conduct current, and hence for controlling the magnitude of an electrical condition such as the current of load circuit 1, I provide phase shifting means 55 for controlling the phase of the periodic voltage of peaked wave form produced by the peaking transformers 23. The phase shifting means 55 may be of the static impedance type, that is of the type comprising various combinations of resistance, inductance and capacitance, and in the arrangement illustrated comprises a transformer 56 and a bridge network which includes one parallel path comprising a variable impedance element, such as a variable impedance 57 having a variable resistance component and a resistance 58. The other parallel path includes a second variable or adjustable impedance element, such as resistance 59 having an adjustable contact 60 and a capacitance 61. Output circuit 62 of the phase shifting means 55 is connected to the primary windings 24 of transformers 23.

The effective value of the impedance 57 may be controlled by arranging the impedance 57 to have a winding 63 provided with an intermediate connection 64, and by employing a pair of electric valves 65 and 66 preferably of the high-vacuum type each provided with a grid 67. As the electric valves 65 and 66 are caused to conduct different amounts of current by variations in the potential of the grids 67, the effective impedance of element 57 varies to control the phase relation of the alternating voltage supplied to output circuit 62.

I provide control means 68 which varies the potential of the grids 67 of electric valves 65 and 66 and which thereby controls the amount of current transmitted by the electric valve means 2 and 3 by varying or controlling the phase of the voltage of peaked wave form produced by peaking transformers 23. This control means may comprise an amplifier 69 which is energized from a suitable source of direct current 70. The source of direct current 70 may be provided by means of a rectifier 71 and a filtering circuit 72. Amplifier 69 comprises an electric discharge device 73, preferably of the high vacuum type, comprising an anode 74, a cathode 75, a control grid 76 and a screen grid 77. The cathode 75 is maintained at a predetermined potential above the negative terminal of the direct current source 70 by means of a constant voltage device, such as a glow discharge valve 78. A variable control potential is produced by means of an impedance element, such as a resistance 79, connected in the anode-cathode circuit of electric discharge device 73. Output circuit 80 of the amplifier 69 may be connected between resistance 79 and the anode of discharge device 73 and a part of a voltage divider including resistances 81, 82, 83 and 84 which are energized from the direct current source 70. The voltage divider may be provided with an adjustable connection 85 which adjusts the range of control voltage produced in the output circuit 80.

The control means 68 also comprises an electric discharge device 86 which comprises an anode 87 and a cathode 88 of the filamentary type having a heating element or filament 89. A suitable source of current, such as a direct current source 90, may be employed for energizing the anode-cathode circuit of discharge device 86. The source 90 may be supplied by means of a rectifier 91 and a filtering circuit 92. As a means for supplying a substantially constant voltage to the electric valve circuit of discharge device 86, I provide a voltage divider comprising a serially connected resistance 93 and a constant voltage device, such as a glow discharge valve 94, which maintains across its terminals a substantially constant voltage when in a conducting condition. A further resistance 95 may be connected across glow discharge valve 94. Variable amounts of unidirectional current are transmitted through a resistance 96 which is connected in series relation with the anode-cathode circuit of discharge device 86. The positive terminal of resistance 96 is connected to the control grid 76 of electric discharge device 73 in the amplifier circuit 69 through conductor 97, and a current limiting resistance 98. The negative terminal of the resistance 96 may be connected to the adjustable connection or tap 85 of resistance 83 through a conductor 99.

Although the electric discharge device 86 is illustrated as being of the type in which the cathode 88 is indirectly heated, it will be understood that I may employ a discharge device of the type in which the cathode is directly heated. By the term "electric discharge device of the filamentary type," I intend to cover that type of electric discharge device wherein the emission of the cathode may be controlled by variation of the cathode temperature occasioned by transmitting different amounts of current to an element of the device.

Variations in the conductivity of electric discharge device 86 are employed as the means for producing the variable control potential across resistance 96. More specifically, I provide means for transmitting variable amounts of current to filament 89 in accordance with a predetermined controlling influence, such as an electrical condition of the load circuit 1. In the particular embodiment of my invention illustrated, the current of load circuit 1 is employed as the controlling influence. For example, a current transformer 100 may be connected in series with the load circuit 1 and employed to energize a transformer 101.

I provide means for energizing the filament 89 during the periods of energization of the load circuit 1. As a means for connecting the filament 89 to the transformers 100 and 101, I employ suitable means, such as a relay 102, which comprises an actuating coil 103 and may include contacts 104 and 105, the latter of which are connected in series relation with secondary winding 106 of transformer 101 and the filament 89 of electric discharge device 86. When the relay 102 is in the energized position, contacts 105 are closed. Adjustable means for controlling the conductivity of the electric discharge device 86, and hence for establishing the magnitude of the current which is maintained in the load circuit 1, is connected in circuit with the filament 89. This means may comprise an adjustable resistance 107, or a variable impedance, such as resistance 108, may be connected across secondary winding 106 if desired. The voltage appearing across resistance 108 varies in accordance with the load current.

In order to increase the accuracy and speed of response of the regulating or control circuit, I provide means for pre-setting or pre-conditioning the electric discharge device 86 and the associated control means prior to each energization of the load circuit 1. Of course, when the load circuit 1 is energized intermittently or periodically, the pre-setting or pre-conditioning is effected during each period of time intermediate the periods of energization of the load circuit. This pre-conditioning means may comprise an auxiliary means 109 which may be energized from circuit 22 and may include a transformer 110 and a ballast resistance 111 which effect the transmission of a substantially constant current through a resistance 112. This resistance is provided with an adjustable contact 113 which controls the value of current which is transmitted to filament 89. The auxiliary means 109 may be adjusted to transmit to filament 89 a current of a value which corresponds to the magnitude of the electrical condition, such as the current which it is desired to maintain in the load circuit 1. Contact 113 is connected in circuit with the normally closed contacts 104 of relay 102 and the filament 89 of the electric discharge device 86. Relay 102 selectively energizes the filament 89 of discharge device 86 from the auxiliary means 109 or from transformer 101. Inasmuch as contacts 104 are arranged to be closed when contacts 105 are open, the auxiliary means 109 energizes the filament 89 when the load circuit 1 is deenergized. This action is accomplished by virtue of the fact that the actuating coil 103 is energized only when current flows in the load circuit 1.

As a means for adjusting the magnitude of the current transmitted to filament 89 of discharge device 86, and hence as a means for establishing the degree of conductivity of the electric discharge device 86 in accordance with the magnitude of the current which it is desired to be maintained in the load circuit 1, I provide interlocking means 114 which is connected between the adjustable connection 113 of auxiliary means 109 and the adjustable connection 60 of the variable impedance element 59 of the phase shifting means 55.

The interlocking means 114 may be connected to the movable contact of resistance 108 instead of being connected to the movable contact 113 of resistance 112. Of course, the interlocking means 114 may be connected to both resistances 108 and 112. Where the electric discharge device 86 is of the type which makes it desirable to limit the variation of current to the cathode or the cathode heating element in order to obtain the desired regulatory operation of the system, it may be preferable to interlock only resistance 59 and resistance 108. Furthermore, as illustrated in Fig. 1, it may be desirable to interlock all three elements, that is to interlock resistances 59, 112 and 108.

In order to initiate operation of the system, I may provide a suitable means, such as a manually operable switch 115, which may be connected in circuit with the peaking transformer 41 of the timing means 27. A suitable phase shifting device, such as a rotary phase shifter 116, may be connected between circuit 33 and the transformer 41 to control the phase relationship of the peaked voltage produced thereby, and hence to vary the time at which the generation of the timing voltages are initiated during the half cycles of voltage of circuit 33 and circuit 8.

The operation of the embodiment of my invention shown in Fig. 1 will be explained by considering the system when it is operating to effect intermittent or periodic energization of the load circuit 1. Until switch 115 is closed, the control electric valves 14 and the power or main electric valves 2 and 3 are maintained in a nonconducting condition; therefore, no current is transmitted to load circuit 1. Upon closure of switch 115, peaking transformer 41 is energized, and upon the generation of a voltage of peaked wave form the electric valve 37 will be rendered conducting, effecting discharge of the capacitance 35 which has previously been charged from the direct current source including conductors 28 and 29. The period of time during which the periodic voltage produced by timing means 27 is effective to render the coupling electric valve 45 conducting is controllable or adjustable by means of variable resistance 36 and adjustment of the contact 34' of resistance 34. It will be noted that a negative biasing potential is impressed on grid 47 of electric valve 45, and that the time during which the electric valve 45 conducts current is determined by the relative magnitudes of the voltage derived from resistance 36 and the biasing potential derived from resistance 34. In this manner, it is possible to control the number of half cycles of alternating current transmitted to transformers 48 and, hence, control the period of energization of the load circuit 1.

Inasmuch as the coupling electric valve 46 is arranged to follow electric valve 45, an even number of half cycles of alternating current will be transmitted by these electric valves.

The negative biasing potentials impressed on grids 15 of control electric valves 14 are sufficient to maintain the electric valves nonconducting in the absence of the alternating voltages introduced in the excitation circuits 12 and 13 by transformers 48, inasmuch as the peaked voltages produced by transformers 23 are not sufficient to overcome the effect of these biasing potentials. However, when transformers 48 are energized, the alternating voltages produced thereby, acting in conjunction with the periodic voltages of peaked wave form, are sufficient to render the electric valves 14 and hence electric valve means 2 and 3 conducting alternately for a predetermined number of half cycles corresponding to the number of half cycles of voltage during which the transformers 48 are energized. The time during the respective positive half cycles of anode-cathode voltage at which the electric valves 2 and 3 are rendered conducting is determined principally by the phase position of the periodic voltages of peaked wave form produced by transformers 23.

The phase shifting circuit 55 and the control means 68 serve to control the phase relation of the periodic voltages of peaked wave form to maintain the load current at a precise value. Prior to the energization of load circuit 1, the auxiliary means 109 has pre-conditioned or preset the conductivity of the electric discharge device 86 to a value which corresponds to the value of current which it is desired to maintain in the load circuit. This pre-setting value may be obtained by adjustment of resistance 112.

Upon energization of the load circuit 1, actuating coil 103 of relay 102 is energized through transformers 100 and 101, thereby closing contacts 105 and opening contacts 104, the latter of which disconnect the auxiliary means 109 from the filament 89. Upon closure of contacts 105, filament 89 is energized in accordance with the load current. If it be assumed that the load current tends to increase above the desired value, the energization of the filament 89 is correspondingly increased effecting an increase in the anode-cathode current conducted by discharge device 86 and thereby raising the potential of control grid 76 of discharge device 73 in the amplifier circuit 69. Consequently, the discharge device 73 conducts an increased amount of current through resistance 79, lowering the potential of grids 67 of electric valves 65 and 66. These electric valves conduct a smaller amount of current through winding 63, and thereby increase the effective resistance of element 57 and effect a retardation in phase of the alternating voltage supplied to the peaking transformers 23. This retardation in phase causes the electric valves 14 and the power electric valve means 2 and 3 to be rendered conducting at later times during the positive half cycles of anode-cathode voltage, and consequently effect a reduction in the magnitude of the load current to the desired value. The control system also responds to raise the load current to the desired value if it tends to decrease below that value.

The magnitude of the current which is transmitted to the load circuit 1 may, of course, be adjusted by means of the variable impedance element 59 of phase shifting circuit 55. By virtue of the interlock or coupling 114, the resistance 112 of the auxiliary means 109 is also automatically and simultaneously adjusted to change the pre-set condition or conductivity of electric discharge device 88 so that the degree of conductivity of this discharge device is always pre-set to correspond to the value of current which it is desired to maintain in the load circuit.

When the system is operated intermittently, it will be understood that relay 102 is deenergized between the periods of energization of the load circuit, and that the auxiliary means 109 during these intervals maintains the conductivity of the discharge device 86 at the desired value, so that the system is always in a condition susceptible of obtaining a high degree of accuracy irrespective of the intermittent operation of the translating apparatus.

Due to the fact that the electric valve means 2 and 3 are connected reversely in parallel, alternating current is transmitted to the load circuit 1. The magnitude or effective value of the alternating current is determined by the time during the respective positive half cycles of applied anode-cathode voltage at which the electric valve means are rendered conducting.

I have found that where it is desired to obtain limitation of the current transmitted to the welding circuit during the initiation of each period of energization, the resistance 112 may be adjusted to furnish at first a signal which indicates a larger value of current in the load circuit than that which it is desired to be maintained. This means that the discharge device 86 initially conducts a slightly larger value of current, thereby effecting retardation in phase of the alternating voltage supplied to output circuit 62 of phase shifting means 65, and correspondingly retards the phase of the voltages of peaked wave form of excitation circuits 12 and 13. In some applications where a relatively large number of half cycles of current are transmitted consecutively to the load circuit, it is important to maintain the first few half cycles of current at a lightly lower value than the succeeding half cycles, in which case the auxiliary means 109 is adjusted to transmit a current to the filament 89 which is larger than the reference current which the system is designed or adjusted to maintain. After the occurrence of the first few half cycles under this condition of operation, the control system takes over the control to maintain accurately the larger value of load current.

It will be understood that the auxiliary means 109 may be adjusted so that the current transmitted to the load circuit 1 at the beginning of each period of energization is larger than that which is ultimately maintained therein after the current responsive means becomes effective. In this manner, the few initial half cycles of energization of the load circuit may be characterized by having a current of different value than that which is transmitted and maintained in the load circuit after the current responsive means assumes control.

Resistance 108 may also be employed as a means for adjusting the magnitude of the load current which is maintained and, if desired, the resistance 108 may be operated simultaneously with the variable impedance element 59 in the phase shifting circuit 55. Suitable interlocking or coupling means may be provided between these two elements of the system, if desired.

While I have illustrated my invention as applied to a system in which an intermittent or periodic energization of the load circuit is obtained by the closure of a switch, such as the manually operable switch 115, it will be understood that my invention is not limited thereto and may be applied to those arrangements where a single energization or period of energization of the load circuit is obtained in response to a single circuit controlling operation.

Another embodiment of my invention is illustrated in Fig. 2 relating to a photoelectric control system which may be applied to the system generally illustrated in Fig. 1. The arrangement of Fig. 2 may be connected to conductors 97 and 99 and may replace the electric discharge device 86. In the circuit shown in Fig. 2, I provide a light emitting source, such as a lamp 117, having a filament 118 which is variably energized in accordance with a predetermined controlling influence or an electrical condition such as the current of load circuit 1. Suitable means, such as the relay 102, may also be employed to connect selectively the filament 118 to the auxiliary means 109, or to means responsive to the load current.

I provide a light sensitive means, such as a photoelectric cell or valve 119, which controls the potential across an impedance element such as a variable resistance 120, thereby controlling the potential of control grid 76 of electric discharge device 73. The photoelectric valve 119 may be energized from a suitable source of direct current, such as a battery 121, and suitable filtering means such as a capacitance 122 and resistance 123 may be connected across the resistance 120 to filter out undesirable components of voltages which may be present in the system.

The filament 118 of the lamp 117 is variably energized in response to the load current causing corresponding variations in the intensity of light emitted, thereby varying the current conducted by the light sensitive valve 119. Variations in the current conducted by valve 119 control the potential across resistance 120 and, consequently, control the potential of grid 76 of the electric discharge device 73 in the amplifier circuit 69. Variations in load current produce variations in phase of the output voltage of circuit 62 in a manner corresponding to that produced by the electric discharge device 86 in Fig. 1 and explained above.

The relay 102 and auxiliary means 109 serve to pre-condition the lamp 117 so that the filament 118 is energized at a precise value of current in order that the system is at all times in condition to maintain the load current constant.

The claims in this application are directed to the embodiment illustrated in Fig. 2 of the drawing. Claims generic to Figs. 1 and 2 and specific to the embodiment of Fig. 1 are presented in my application Serial No. 480,150, filed March 23, 1943, which is a continuation-in-part of this application.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating-current circuit, an output circuit, a phase-shifting circuit connected between said circuits and comprising variable impedance means, a light-emitting source including a filament, means for variably energizing said filament, presetting means for establishing a predetermined energization of said filament, means for selectively energizing said filament from said last two mentioned means, a light-sensitive electric valve arranged to receive light from said source which varies in accordance with the energization of said filament, and means for controlling said variable impedance means in accordance with the light received by said electric valve.

2. In combination, an alternating current supply circuit, a load circuit, electric translating apparatus connected between said circuits and comprising electric valve means having a control member, excitation means connected to said control member for impressing thereon a periodic voltage, means connected to said excitation circuit for effecting intermittent energization of said load circuit, phase shifting means connected to said excitation circuit for controlling the phase of said periodic voltage and for controlling a predetermined electrical condition of said load circuit, control means for said phase shifting means comprising a light sensitive means, a light emitting source comprising a filament, means for variably energizing said filament in accordance with said electrical condition during each energization of said load circuit, and auxiliary means for transmitting to said filament a current of predetermined value to precondition said light emitting source prior to each energization of said load circuit.

3. In combination, an alternating-current supply circuit, a load circuit, electric translating apparatus connected between said circuits and comprising electric valve means having a control member, means for energizing said control member to determine the periods of energization and deenergization of said load circuit, means for energizing said control member to control the instant in the anode-cathode voltage of said electric valve means that said valve means is rendered conductive comprising a light-sensitive electric device, an electric lamp for controlling said device, means responsive to an electrical condition of said load circuit, means for establishing an electrical quantity corresponding to a predetermined level of said condition, and means for selectively energizing said lamp in accordance with said condition-responsive means during periods of energization of said load circuit and in accordance with said electrical quantity during periods of deenergization of said load circuit to regulate said valve means in accordance with said load condition during periods of energization thereof and in accordance with said electrical quantity prior to each of said periods of energization.

4. In combination, an alternating-current supply circuit, a load circuit, electric translating apparatus connected between said circuits and comprising electric valve means having a control member, means for energizing said control member to determine the periods of energization and deenergization of said load circuit, means for energizing said control member to control the instant in the anode-cathode voltage of said electric valve means that said valve means is rendered conductive comprising a light-sensitive electric device, an electric lamp for controlling said device, means responsive to the current transmitted to said load circuit, means for establishing an electrical quantity corresponding to a predetermined level of current in said load circuit, and means for selectively energizing said lamp in accordance with said current-responsive means during periods of energization of said load circuit and in accordance with said electrical quantity during periods of deenergization of said load circuit to regulate said valve means in accordance with the load current during periods of energization and in accordance with said electrical quantity prior to each of said periods of energization.

BENJAMIN COOPER.